(12) United States Patent
Zhu et al.

(10) Patent No.: US 12,722,182 B2
(45) Date of Patent: Sep. 1, 2026

(54) BATTERY POLE PIECE FORMING APPARATUS AND FORMING METHOD

(71) Applicant: EVE ENERGY CO., LTD., Guangdong (CN)

(72) Inventors: Liang Zhu, Guangdong (CN); Ruirui Zhao, Guangdong (CN); Junhua Li, Guangdong (CN); Yuan Zhu, Guangdong (CN); Jianhua Liu, Guangdong (CN); Jincheng Liu, Guangdong (CN)

(73) Assignee: EVE ENERGY CO., LTD., Guangdong (CN)

( * ) Notice: Subject to any disclaimer, the term of this patent is extended or adjusted under 35 U.S.C. 154(b) by 547 days.

(21) Appl. No.: 18/272,321

(22) PCT Filed: Feb. 3, 2021

(86) PCT No.: PCT/CN2021/074986
§ 371 (c)(1),
(2) Date: Jul. 13, 2023

(87) PCT Pub. No.: WO2022/151541
PCT Pub. Date: Jul. 21, 2022

(65) Prior Publication Data

US 2024/0066549 A1 Feb. 29, 2024

(30) Foreign Application Priority Data

Jan. 13, 2021 (CN) ........................ 202110042215.X

(51) Int. Cl.
*H01M 6/00* (2006.01)
*B05C 19/00* (2006.01)
(Continued)

(52) U.S. Cl.
CPC ......... *B05C 19/008* (2013.01); *H01M 4/0409* (2013.01); *H01M 4/139* (2013.01); *H01M 10/0404* (2013.01)

(58) Field of Classification Search
CPC .... H01M 4/0409; H01M 4/0435; H01M 4/39; H01M 4/0404; H01M 4/043; H01M 4/0402; B05C 19/008
See application file for complete search history.

(56) References Cited

U.S. PATENT DOCUMENTS

2016/0043382 A1 2/2016 Tanihara
2016/0052010 A1 2/2016 Hamabe
(Continued)

FOREIGN PATENT DOCUMENTS

CN 2395875 Y 9/2000
CN 103357557 A 10/2013
(Continued)

OTHER PUBLICATIONS

First Chinese Office Action dated Mar. 9, 2024 issued on Chinese application No. 202110042215.X.
(Continued)

*Primary Examiner* — Raymond Alejandro
(74) *Attorney, Agent, or Firm* — HUNTON ANDREWS KURTH LLP

(57) ABSTRACT

A battery pole piece forming apparatus includes a conveying mechanism configured to convey a substrate; a feeding mechanism; and a press roller mechanism. The press roller mechanism includes a first press roller, a second press roller, a third press roller, and a fourth press roller arranged side by side in sequence. The first press roller and the second press roller are configured to roll-press active substance particles conveyed by the feeding mechanism to form a first membrane. The third press roller and the fourth press roller are
(Continued)

configured to roll-press active substance particles conveyed by the feeding mechanism to form a second membrane. The second press roller and the third press roller are configured to roll-press the first membrane and the second membrane onto one side of the substrate (and another side of the substrate respectively.

18 Claims, 5 Drawing Sheets

(51) Int. Cl.

| | |
|---|---|
| ***H01M 4/04*** | (2006.01) |
| ***H01M 4/139*** | (2010.01) |
| ***H01M 10/04*** | (2006.01) |

(56) References Cited

U.S. PATENT DOCUMENTS

2017/0072512 A1* 3/2017 Umehara ............. B23K 26/402
2017/0120505 A1* 5/2017 Nakano ............... B29C 65/7894

FOREIGN PATENT DOCUMENTS

| | | | |
|---|---|---|---|
| CN | 104868092 | A | 8/2015 |
| CN | 107571517 | A | 1/2018 |
| CN | 107574679 | A | 1/2018 |
| CN | 107584846 | A | 1/2018 |
| CN | 206878098 | U | 1/2018 |
| CN | 108598372 | A | 9/2018 |
| CN | 108899468 | A | 11/2018 |
| CN | 109390562 | A | 2/2019 |
| CN | 111822663 | A | 10/2020 |
| CN | 112864346 | A | 5/2021 |
| CN | 215152086 | U | 12/2021 |
| JP | 2002212608 | A | 7/2002 |
| JP | 2012120952 | A | 6/2012 |
| JP | 2016025060 | A | 2/2016 |
| JP | 2018125201 | A | 8/2018 |
| KR | 20130074644 | A | 7/2013 |
| WO | 2014156357 | A1 | 10/2014 |

OTHER PUBLICATIONS

Extended European Search Report dated Aug. 12, 2024 issued in EP 21918740.8.

International Search Report dated Sep. 1, 2021 issued in PCT/CN2021/074986.

* cited by examiner

BATTERY POLE PIECE FORMING APPARATUS AND FORMING METHOD

CROSS REFERENCE TO RELATED APPLICATIONS

This is a National Stage Application, filed under 35 U.S.C. 371, of International Patent Application No. PCT/CN2021/074986, filed on Feb. 3, 2021, which claims priority to Chinese patent application No. 202110042215.X filed on Jan. 13, 2021, contents of all of which are incorporated herein by reference in their entireties.

TECHNICAL FIELD

The present application relates to the field of battery pole piece production equipment, for example, a battery pole piece forming apparatus and method.

BACKGROUND

With a large energy density, a lithium-ion battery has been applied to a device such as a mobile phone or a laptop. However, as lithium-ion batteries have broader and more advanced use, a lithium-ion battery is required to have a better performance including a low resistance and a large capacity.

The electrode of a lithium-ion battery may be a battery pole piece. For example, to produce a calendered sheet such as a battery pole piece from a powder containing an electrode active substance, a powder calendering device is used to compression mold the powder. In a powder calendering device, two press rollers each compression mold powder on a respective side of a substrate to obtain a battery pole piece. However, the substrate is prone to jitter when being conveyed, causing powders on two sides of the substrate to have different thicknesses. In this manner, in a later operation process, the battery pole piece swells differently in different areas of the battery pole piece. As a result, the powders easily fall from the substrate, affecting the subsequent normal operation of the lithium-ion battery.

SUMMARY

The present application provides a battery pole piece forming apparatus and method, solving a problem of the related art in which powders on two sides of a substrate have different thicknesses and thus affect the subsequent normal operation of a lithium-ion battery.

A battery pole piece forming apparatus includes a conveying mechanism configured to convey a substrate; a feeding mechanism; and a press roller mechanism. The press roller mechanism includes a first press roller, a second press roller, a third press roller, and a fourth press roller arranged side by side in sequence. The spacing between the first press roller and the second press roller is the same as the spacing between the third press roller and the fourth press roller.

The second press roller and the third press roller are configured to make the substrate pass between the second press roller and the third press roller along the vertical direction. The first press roller and the second press roller are configured to roll-press active substance particles conveyed by the feeding mechanism to form a first membrane. The third press roller and the fourth press roller are configured to roll-press active substance particles conveyed by the feeding mechanism to form a second membrane. The second press roller and the third press roller are configured to roll-press the first membrane and the second membrane onto one side of the substrate and another side of the substrate respectively.

An embodiment provides a battery pole piece forming method. The method is applied to the battery pole piece forming apparatus and includes roll-pressing active substance particles to form a first membrane and a second membrane that have the same thickness; and roll-pressing the first membrane and the second membrane onto one side of a substrate and another side of the substrate respectively.

REFERENCE LIST

Figure 1:
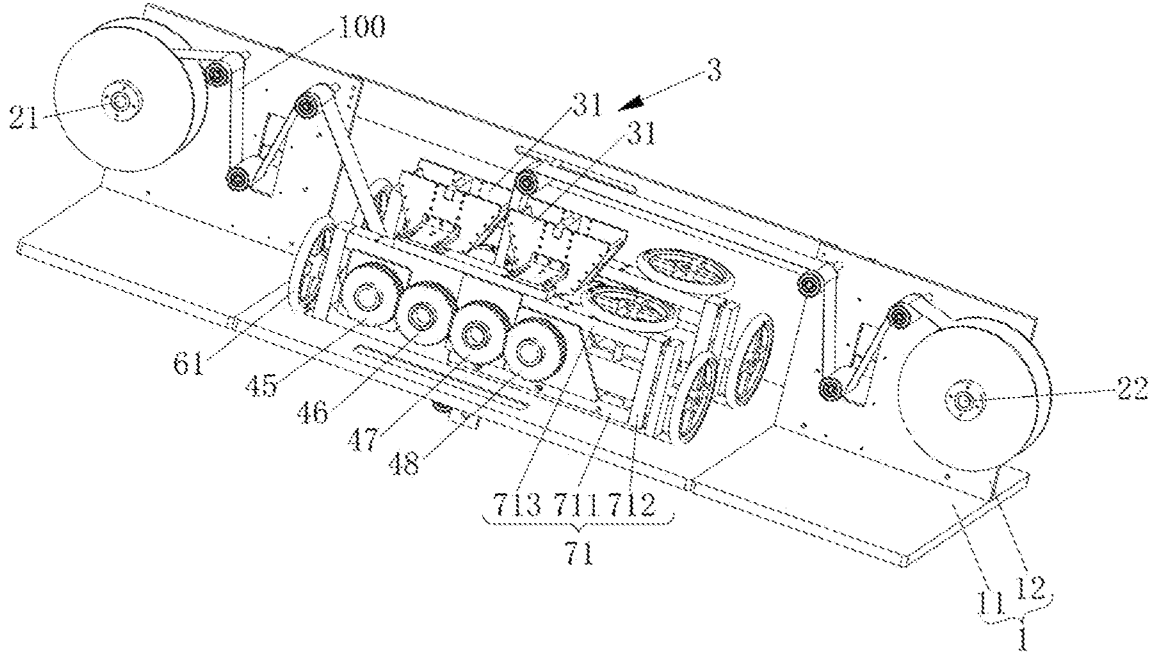
FIG. 1 is a view of a pole piece forming apparatus according to an embodiment of the present application.

1 support bracket
11 horizontal support plate
111 extension plate
1111 fourth chute
12 vertical support plate
121 third chute
2 conveying mechanism
21 first support member
22 second support member
221 winding roller
23 first support roller
24 second support roller
25 third support roller
3 feeding mechanism
31 hopper
32 active substance particles
321 first membrane
322 second membrane
4 press roller mechanism
41 first press roller
42 second press roller
43 third press roller
44 fourth press roller
45 first gear
46 second gear
47 third gear
48 fourth gear
5 first mounting assembly
51 first mounting structure
52 second mounting structure
53 fastener
6 first driving structure
61 first runner
62 first connecting rod
7 second mounting assembly
71 support structure
711 first portion
712 second portion
713 third portion

72 third mounting structure
73 fourth mounting structure
74 second fastener
8 second driving structure
81 second runner
82 second connecting rod
9 third driving structure
91 third runner
92 third connecting rod
93 pushing block
94 second elastic member
95 first elastic member
10 substrate web
100 substrate

DETAILED DESCRIPTION

In the description of the present application, the terms "joined", "connected", and "fixed" are to be understood in a broad sense unless otherwise expressly specified and limited. For example, the term "connected" may refer to "fixedly connected", "detachably connected", or integrated, may refer to "mechanically connected" or "electrically connected", or may refer to "connected directly", "connected indirectly through an intermediary", "connected inside two components", or "interaction relations between two components". For those of ordinary skill in the art, specific meanings of the preceding terms in the present application may be understood based on specific situations.

In the present application, unless otherwise expressly specified and limited, when a first feature is described as "on" or "below" a second feature, the first feature and the second feature may be in direct contact or be in contact via another feature between the two features instead of being in direct contact. Moreover, when the first feature is described as "on", "above", or "over" the second feature, the first feature is right on, above, or over the second feature or the first feature is obliquely on, above, or over the second feature, or the first feature is simply at a higher level than the second feature. When the first feature is described as "under", "below", or "underneath" the second feature, the first feature is right under, below, or underneath the second feature or the first feature is obliquely under, below, or underneath the second feature, or the first feature is simply at a lower level than the second feature.

In the description of the present application, it should be noted that the orientations or position relations indicated by terms such as "above", "below", "right" and the like are based on orientations or position relations shown in the drawings. These orientations or position relations are intended only to facilitate and simplify description of the present application, and not to indicate or imply that a device or element referred to must have such specific orientations or must be configured or operated in such specific orientations. Thus, these orientations or position relations are not to be construed as limiting the present application. In addition, the terms "first" and "second" are used only to distinguish between descriptions and have no special meaning.

Figure 2:
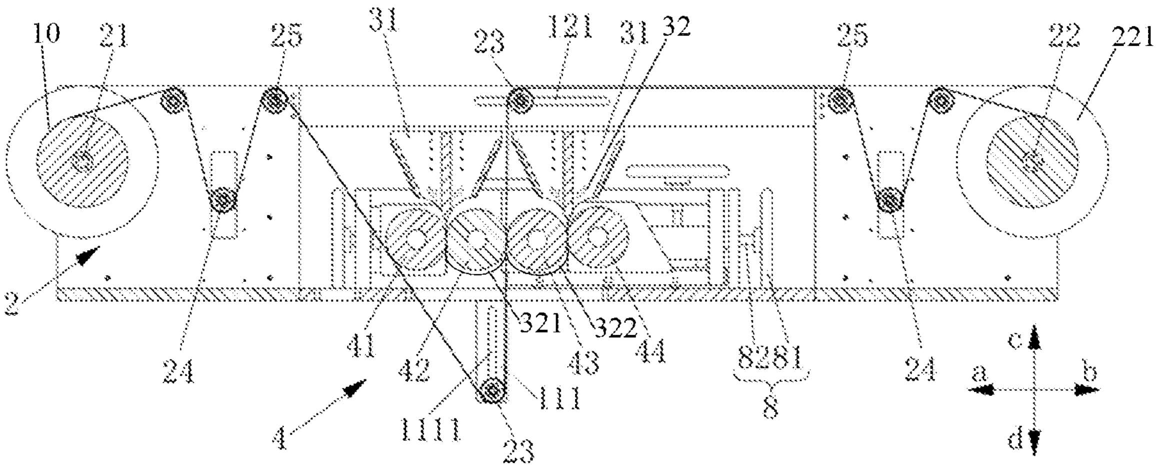
FIG. 2 is a section view of a pole piece forming apparatus according to an embodiment of the present application.
Figure 3:
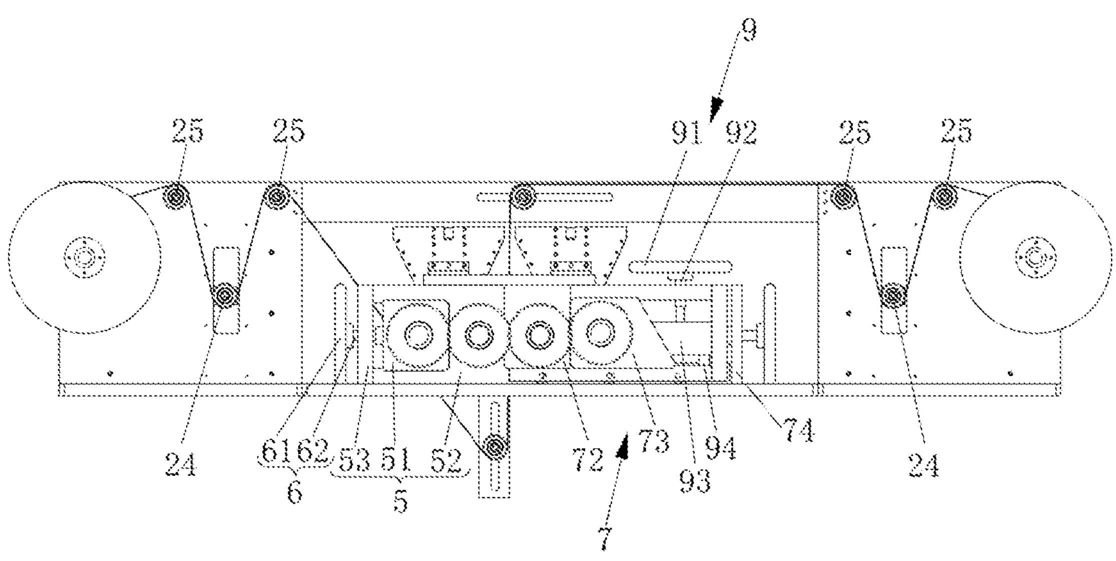
FIG. 3 is a front view of a pole piece forming apparatus according to an embodiment of the present application.

As shown in FIGS. 1 to 3, this embodiment provides a battery pole piece forming apparatus. The battery pole piece forming apparatus includes a conveying mechanism 2 configured to convey a substrate 100; a feeding mechanism 3; and a press roller mechanism 4. The press roller mechanism 4 includes a first press roller 41, a second press roller 42, a third press roller 43, and a fourth press roller 44 arranged side by side in sequence. The spacing between the first press roller 41 and the second press roller 42 is the same as the spacing between the third press roller 43 and the fourth press roller 44. The second press roller 42 and the third press roller 43 are configured to make the substrate 100 pass between the second press roller 42 and the third press roller 43 along the vertical direction. The first press roller 41 and the second press roller 42 are configured to roll-press active substance particles 32 conveyed by the feeding mechanism 3 to form a first membrane 321. The third press roller 43 and the fourth press roller 44 are configured to roll-press active substance particles 32 conveyed by the feeding mechanism 3 to form a second membrane 322. The second press roller 42 and the third press roller 43 are configured to roll-press the first membrane 321 and the second membrane 322 onto one side of the substrate 100 and another side of the substrate 100 respectively.

The rotation direction of the first press roller 41 is opposite to the rotation direction of the third press roller 43. The rotation direction of the second press roller 42 is opposite to the rotation direction of the fourth press roller 44. The first membrane 321 roll-pressed by the first press roller 41 and the second press roller 42 is attached to the second press roller 42. The second membrane 322 roll-pressed by the third press roller 43 and the fourth press roller 44 is attached to the third press roller 43. Then the second press roller 42 and the third press roller 43 roll-press the first membrane 321 and the second membrane 322 onto one side of the substrate 100 and another side of the substrate 100 respectively. With this arrangement, the first membrane 321 and the second membrane 322 on two sides of the substrate 100 have the same thickness so that the formed battery pole piece has a uniform thickness. Moreover, it is possible to roll-press active substance particles 32 to form the membranes and form the battery pole piece simultaneously so that the battery pole piece can be formed more efficiently.

In an embodiment, to make the first membrane 321 better attached to the second press roller 42, the temperature of the first press roller 41 is greater than the temperature of the second press roller 42. In this embodiment, the temperature of the first press roller 41 is 40° C. to 300° C., and the temperature of the second press roller 42 is room temperature, so that the first membrane 321 can be better attached to the second press roller 42 after being roll-formed. In an embodiment, to make the second membrane 322 better attached to the third press roller 43, the temperature of the fourth press roller 44 is greater than the temperature of the third press roller 43. In this embodiment, the temperature of the fourth press roller 44 is 40° C. to 300° C., and the temperature of the third press roller 43 is room temperature, so that the second membrane 322 can be better attached to the third press roller 43 after being roll-formed.

In this embodiment, the first press roller 41, the second press roller 42, the third press roller 43, and the fourth press roller 44 are each 0.4 μm to 0.8 μm in roughness.

In an embodiment, as shown in FIG. 1, the feeding mechanism 3 includes at least two hoppers 31. A feeding port of at least one of the at least two hoppers 31 is located between and disposed above the first press roller 41 and the second press roller 42. A feeding port of at least another one of the at least two hoppers 31 is located between and disposed above the third press roller 43 and the fourth press roller 44. In this embodiment, the feeding mechanism 3 includes two hoppers 31. It is to be understood that the first membrane 321 is roll-formed from active substance particles 32 conveyed by its corresponding hopper 31, and the second membrane 322 is roll-formed from active substance particles 32 conveyed by its corresponding hopper 31. In this manner, when the two hoppers convey active substance particles 32 at the same rate, the active substance particles 32 are conveyed uniformly, and thereby the first membrane 321 and the second membrane 322 can have the same thickness. Of course, more than two hoppers 31 may be provided.

In an embodiment, the conveying mechanism 2 includes a first support member 21 and a second support member 22. The first support member 21 is configured to support a substrate web 10. A winding roller 221 is disposed on the second support member 22 and configured to drive the substrate 100 to pass between the second press roller 42 and the third press roller 43. In an embodiment, the conveying mechanism 2 also includes two first support rollers 23 configured to support the substrate 100. One of the two first support rollers 23 is arranged above the other of the two first support rollers 23 so that the substrate 100 located between the two first support rollers 23 is vertically arranged. In an embodiment, the substrate 100 between the two first support rollers 23 vertically passes between the second press roller 42 and the third press roller 43 under the action of the two first support rollers 23 so that the second press roller 42 roll-presses the first membrane 321 onto one side of the substrate 100 and the third press roller 43 roll-presser the second membrane 322 onto another side of the substrate 100.

In an embodiment, the conveying mechanism 2 also includes a second support roller 24 and a third support roller 25. At least one second support roller 24 and at least one third support roller are located between the first support member 21 and the press roller mechanism 4. At least one second support roller 24 and at least one third support roller 25 are located between the second support member 22 and the press roller mechanism 4. The second support roller 24 and the third support roller 25 can support and tension the substrate 100. In this embodiment, one second support roller 24 and two third support rollers 25 are disposed between the first support member 21 and the press roller mechanism 4. In an embodiment, as shown in FIG. 3, the second support roller 24 is located between the two third support rollers 25 and is vertically located below the two third support rollers 25. One second support roller 24 and two third support rollers 25 are disposed between the second support member 22 and the press roller mechanism 4. The second support roller 24 is located between the two third support rollers 25 and is vertically located below the two third support rollers 25. In this embodiment, the substrate 100 passes by from below the two second support rollers 24.

In this embodiment, the position of each second support roller 24 can be vertically adjusted such that the substrate 100 can be tensioned. In other embodiments, the position of a third support roller 25 may be vertically adjusted such that the substrate 100 can be tensioned.

In an embodiment, as shown in FIGS. 1 and 2, the pole piece forming apparatus of this embodiment also includes a support bracket 1. The support bracket 1 includes a horizontal support plate 11 and a vertical support plate 12. The vertical support plate 12 is connected to and perpendicular to the horizontal support plate 11. The first support member 21, the second support member 22, the first support roller 23, the second support roller 24, and the third support roller 25 are each disposed on the vertical support plate 12.

In this embodiment, the vertical support plate 12 is provided with multiple linear guide rails (which is also referred as to vertical guide rails) extending along the vertical direction. The multiple vertical guide rails correspond to the positions of the two second support rollers 24. The two second support rollers 24 are slidably disposed on the linear guide rails so as to be movable in the vertical direction. In this embodiment, the position of the upper first support roller 23 of the two first support rollers 23 is horizontally adjustable to adjust a verticality of substrate 100 between the two first support rollers 23; and the position of the lower first support roller 23 of the two first support rollers 23 is vertically adjustable to avoid interference occurred between the substrate 100 and the first press roller 41. In an embodiment, a third chute 121 is horizontally disposed on the vertical support plate 12, and the upper first support roller 23 of the two first support rollers 23 is slidably disposed in the third chute 121. The horizontal support plate 11 is provided with an extension plate 111 extending along the vertical direction. A fourth chute 1111 extending along the vertical direction is disposed on the extension plate 111. The lower first support roller 23 of the two first support rollers 23 is slidably disposed in the fourth chute 1111. Here the horizontal direction is direction ab of FIG. 2, and the vertical direction is direction cd of FIG. 2.

In an embodiment, as shown in FIGS. 1 to 3, the battery pole piece forming apparatus also includes a first driving mechanism and a first mounting assembly 5. The first press roller 41 and the second press roller 42 are mounted on the first mounting assembly 5. The first driving mechanism is configured to drive the first press roller 41 to move towards or away from the second press roller 42.

In this embodiment, the first mounting assembly 5 includes two first mounting structures 51 opposite to each other and two second mounting structures 52 opposite to each other, the first press roller 41 is rotatably mounted between the two first mounting structures 51, and the second press roller 42 is rotatably mounted between the two second mounting structures 52. In an embodiment, each second mounting structure 52 is provided with a first chute, each first mounting structure 51 is slidably disposed in the corresponding first chute, and the first driving mechanism is configured to push the first mounting structure 51 to slide along the corresponding first chute so as to drive the first press roller 41 to move towards or away from the second press roller 42.

In an embodiment, the first mounting assembly 5 also includes two first fasteners 53. The two first fasteners 53 are connected to the two second mounting structures 52 one to one. The first driving mechanism includes two first driving structures 6. The two first driving structures 6 are each configured to drive a respective one of the two first mounting structures 51 to slide. In an embodiment, each first driving structure 6 includes a first runner 61 and a first connecting rod 62 connected to each other. The first connecting rod 62 passes through the corresponding first fastener 53 and is connected to the corresponding first mounting structure 51. The first connecting rod 62 is screwed to the corresponding first fastener 53. The first runner 61 is configured to rotate to drive the corresponding first mounting structure 51 to slide along the corresponding first chute so that the spacing between the first press roller 41 and the second press roller 42 can be adjusted.

In this embodiment, the second mounting structures 52 and the first fasteners 53 are mounted on the horizontal support plate 11. In this embodiment, each first mounting structure 51 includes one first mounting block, and the first press roller 41 is mounted between two first mounting blocks. In other embodiments, each first mounting structure 51 may include multiple first mounting blocks. In this embodiment, each second mounting structure 52 includes one second mounting block, and the second press roller 42 is mounted between two second mounting blocks. In other embodiments, each second mounting structure 52 may include multiple second mounting blocks.

In other embodiments, the first driving mechanism may drive the second press roller 42 to move towards or away from the first press roller 41. In an embodiment, the first mounting assembly 5 includes two fifth mounting structures opposite to each other and two sixth mounting structures opposite to each other. The first press roller 41 is mounted between the two fifth mounting structures. The second press roller 42 is mounted between the two sixth mounting structures. The first driving mechanism includes two fourth driving mechanisms. One of the two fourth driving structures can drive one of the two sixth mounting structures to move towards or away from one corresponding fifth mounting structure. Another of the two fourth driving structures can drive another of the two sixth mounting structures to move towards or away from another corresponding fifth mounting structure. In this embodiment, each fourth driving mechanism may be a cylinder, a motor lead screw, or any other structure that can drive a sixth mounting structure. In an embodiment, the first driving structures can drive the first press roller 41 and the second press roller 42 to move simultaneously to make the first press roller 41 and the second press roller 42 move towards or away from each other. The first driving structures may be designed in any manner as long as they can drive the first press roller 41 and the second press roller 42 to move simultaneously.

In an embodiment, as shown in FIGS. 1 to 3, the battery pole piece forming apparatus also includes a second driving mechanism and a second mounting assembly 7 slidably disposed on the horizontal support plate 11. The third press roller 43 and the fourth press roller 44 are mounted on the second mounting assembly 7. The second driving mechanism is configured to drive the second mounting assembly 7 to move towards or away from the second press roller 42. In this embodiment, the second mounting assembly 7 includes two support structures 71 opposite to each other. The third press roller 43 and the fourth press roller 44 are mounted between the two support structures 71. The second mounting assembly 7 also includes two second fasteners 74. The two second fasteners 74 correspond to the two support structures 71 one to one. The two second fasteners 74 are secured to the horizontal support plate 11. The two support structures 71 are slidably disposed on the horizontal support plate 11. In an embodiment, to enable the support structures 71 to slide stably, limiting slots are disposed in the horizontal support plate 11 to correspond to the positions of the support structures 71 in a one-to-one manner. The support structures 71 are slidably disposed in the limiting slots in a one-to-one manner. In an embodiment, to reduce the friction between a support structure 71 and the horizontal support plate 11, a roller is disposed on the support structure 71. The roller makes the support structure 71 roll relative to the horizontal support plate 11 instead of sliding relative to the horizontal support plate 11, reducing the friction between a support structure 71 and the horizontal support plate 11.

The second driving mechanism includes two second driving structures 8. The second driving structures 8 are each configured to drive a respective one of the two support structures 71 to move. In an embodiment, each second driving structure 8 includes a second runner 81 and a second connecting rod 82 connected to each other. The second connecting rod 82 passes through the corresponding second fastener 74 and is connected to the corresponding support structure 71. The second connecting rod 82 is screwed to the corresponding second fastener 74. The second runner 81 is configured to drive the corresponding support structure 71 to move so that the two second driving structures 8 are each configured to drive a respective one of the two support structures 71 to move, thereby driving the second mounting assembly 7 to move. In this manner, the spacing between the second press roller 42 and the third press roller 43 can be adjusted.

In this embodiment, the second mounting assembly 7 also includes two third mounting structures 72 opposite to each other and two fourth mounting structures 73 opposite to each other. The third press roller 43 is mounted between the two third mounting structures 72. The fourth press roller 44 is mounted between the two fourth mounting structures 73. Each support structure 71 is provided with one third mounting structure 72 and one fourth mounting structure 73. The third mounting structure 72 is secured to the corresponding support structure 71. The fourth mounting structure 73 is slidably disposed on the corresponding support structure 71.

Figure 5:
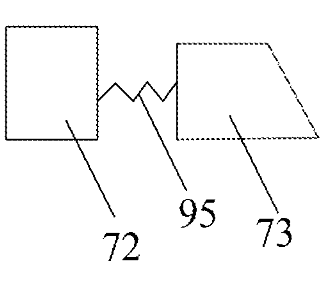
FIG. 5 is a view of a first elastic member, a third mounting structure and a fourth mounting structure according to an embodiment of the present application.

In an embodiment, the support structure 71 is provided with a second chute. The fourth mounting structure 73 is slidably disposed in the second chute. The battery pole piece forming apparatus also includes a third driving mechanism. The third driving mechanism includes two third driving structures 9. Each third driving structure 9 is configured to drive a corresponding fourth mounting structure 73 to move towards or away from a corresponding third mounting structure 72. In an embodiment, each third driving structure 9 includes a driving member, a pushing block 93, and a first elastic member 95. FIG. 5 shows a view of the first elastic member 95, the third mounting structure 72 and the fourth mounting structure 73. The driving member is configured to drive the pushing block 93 to move along the vertical direction. In an embodiment, the driving member includes a third runner 91 and a third connecting rod 92. The third runner 91 is connected to the third connecting rod 92. The third connecting rod 92 is vertically disposed. The first end of the third connecting rod 92 passes through the corresponding support structure 71 and is connected to the pushing block 93. The third connecting rod 92 is screwed to the corresponding support structure 71. The second end of the third connecting rod 92 is provided with the third runner 91. The pushing block 93 is located in the second chute. The first elastic member 95 is disposed between the corresponding third mounting structure 72 and the corresponding fourth mounting structure 73. In an embodiment, the pushing block 93 is provided with a first inclined plane, and the corresponding fourth mounting structure 73 is provided with a second inclined plane abutting against the first inclined plane. When the third runner 91 rotates to make the third connecting rod 92 push the pushing block 93 downwards, the pushing block 93 slides downwards along the second inclined plane and make the third connecting rod 92 push the corresponding fourth mounting structure 73 towards the corresponding third mounting structure 72 so that the spacing between the third press roller 43 and the fourth press roller 44 is reduced. In this process, the first elastic member 95 is compressed. When the third runner 91 rotates to make the third connecting rod 92 drive the pushing block 93 to move upwards, the pushing block 93 slides upwards along the second inclined plane, and the corresponding fourth mounting structure 73 is pushed away from the corresponding third mounting structure 72 under the elastic force of the elastic recovery of the first elastic member 95. In this manner, the spacing between the third press roller 43 and the fourth press roller 44 is increased.

In this embodiment, each third mounting structure 72 includes one third mounting block. The third press roller 43 is mounted between two third mounting blocks. In other embodiment, each third mounting structure 72 may include multiple third mounting blocks. In this embodiment, each fourth mounting structure 73 includes one fourth mounting block. The fourth press roller 44 is mounted between two fourth mounting blocks. In other embodiment, each fourth mounting structure 73 may include multiple fourth mounting blocks.

In other embodiments, the third press roller 43 may be mounted between the two fourth mounting structures 73, and the fourth press roller 44 may be mounted between the two third mounting structures 72. In this case, the third driving mechanism includes two third driving structures 9, and each third driving structure 9 can drive the third press roller 43 to move towards or away from the fourth press roller 44. Alternatively, a third mounting structure 72 is slidably disposed on the corresponding support structure 71, and a fourth mounting structure 73 is secured to the corresponding support structure 71; and the third driving mechanism includes two third driving structures 9, and each third driving structure 9 can drive the corresponding third mounting structure 72 to move towards or away from the corresponding fourth mounting structure 73. Alternatively, a third mounting structure 72 and a fourth mounting structure 73 can be slidably disposed on the corresponding support structure 71. In this case, it is to be understood that the third driving mechanism includes four third driving structures 9, each third mounting structure 72 corresponds to one third driving structure 9, and each fourth mounting structure 73 corresponds to one third driving structure 9.

In an embodiment, each third driving structure 9 also includes a second elastic member 94. The second elastic member 94 is disposed between the pushing block 93 and the corresponding support structure 71. The second elastic member 94 can buffer the movement of the pushing block 93 and can support the pushing block 93 so that when the third runner 91 stops rotating, the position of the pushing block 93 is kept stable so that the spacing between the third press roller 43 and the fourth press roller 44 is kept stable.

As shown in FIGS. 1 to 3, in this embodiment, each support structure 71 includes a first portion 711, a second portion 712, and a third portion 713. The second portion 712 is vertically connected to the first portion 711. The third portion 713 is vertically connected to the second portion 712. The second chute is formed between the first portion 711, the second portion 712, and the third portion 713. The first portion 711 is located in the limiting slot. A roller is disposed on the first portion 711. The second connecting rod 82 is screwed to the second portion 712. One surface of the pushing block 93 abuts against the second portion 712. The third connecting rod 92 passes through the third portion 713 and is connected to the pushing block 93. The third connecting rod 92 is screwed to the third portion 713.

As shown in FIG. 1, to improve the uniformity of rotation of the first press roller 41, the second press roller 42, the third press roller 43, and the fourth press roller 44, one end of the first press roller 41 is connected to a first gear 45, one end of the second press roller 42 is connected to a second gear 46, one end of the third press roller 43 is connected to a third gear 47, and one end of the fourth press roller 44 is connected to a fourth gear 48. The first gear 45 engages with the second gear 46. The second gear 46 engages with the third gear 47. The third gear 47 engages with the fourth gear 48.

In summary, the battery pole piece forming apparatus of this embodiment includes a first press roller 41, a second press roller 42, a third press roller 43, and a fourth press roller 44. The first press roller 41 and the second press roller 42 are configured to roll-press active substance particles 32 to form a first membrane 321. The third press roller 43 and the fourth press roller 44 are configured to roll-press active substance particles 32 to form a second membrane 322. Then the second press roller 42 and the third press roller 43 are configured to roll-press the first membrane 321 and the second membrane 322 onto one side of the substrate 100 and another side of the substrate 100 respectively. With this arrangement, the first membrane 321 and the second membrane 322 on two sides of the substrate 100 have the uniform thickness so that the formed battery pole piece has a uniform thickness. In this manner, active substance cannot fall in a subsequent operation process of the lithium-ion battery, thus preventing a short circuit and improving the safety performance of the lithium-ion battery.

Figure 4:
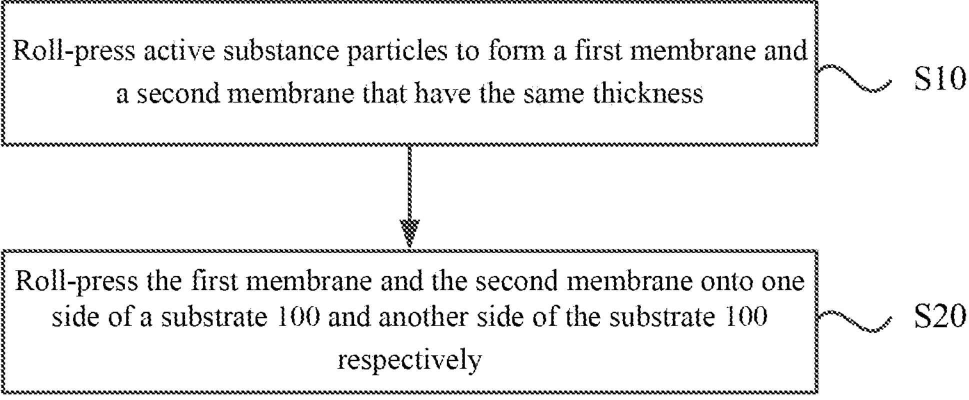
FIG. 4 is a flowchart of a battery pole piece forming method according to an embodiment of the present application.

An embodiment provides a battery pole piece forming method. As shown in FIG. 4, the method includes S10 and S20.

In S10, active substance particles are roll-pressed to form a first membrane and a second membrane that have the same thickness.

In S20, the first membrane and the second membrane are roll-pressed onto one side of the substrate 100 and another side of the substrate 100 respectively.

In this embodiment, roll-pressing of the active substance and forming of the battery pole piece are performed in different steps. First, active substance particles 32 are roll-pressed by a first press roller 41 and a second press roller 42 to form a first membrane 321, and active substance particles 32 are roll-pressed by a third press roller 43 and a fourth press roller 44 to form a second membrane 322. The first membrane 321 and the second membrane 322 have the same thickness. Then the second press roller 42 and the third press roller 43 roll-press the first membrane 321 and the second membrane 322 onto one side of a substrate 100 and another side of the substrate 100 respectively. With this arrangement, the first membrane 321 and the second membrane 322 have a more uniform thickness so that the battery pole piece formed after the first membrane 321 and the second membrane 322 are roll-pressed onto the substrate 100 has a uniform thickness. In this manner, active substance cannot fall in a subsequent operation process of the lithium-ion battery, thus preventing a short circuit and improving the safety performance of the lithium-ion battery.

What is claimed is:

1. A battery pole piece forming apparatus, comprising:

a conveying mechanism configured to convey a substrate;

a feeding mechanism; and a press roller mechanism, wherein the press roller mechanism comprises a first press roller, a second press roller, a third press roller, and a fourth press roller arranged side by side in sequence;

a spacing between the first press roller and the second press roller is the same as a spacing between the third press roller and the fourth press roller;

the second press roller and the third press roller are configured to make the substrate pass between the second press roller and the third press roller along a vertical direction;

the first press roller and the second press roller are configured to roll-press active substance particles conveyed by the feeding mechanism to form a first membrane;

the third press roller and the fourth press roller are configured to roll-press active substance particles conveyed by the feeding mechanism to form a second membrane; and the second press roller is configured to roll-press the first membrane on one side of the substrate and the third press roller is configured to roll-press the second membrane onto another side of the substrate, wherein the battery pole piece forming apparatus further comprises a first driving mechanism and a first mounting assembly, the first press roller and the second press roller are mounted on the first mounting assembly, and the first driving mechanism is configured to drive at least one of the first press roller or the second press roller to make the first press roller and the second press roller move towards or away from each other.

2. The battery pole piece forming apparatus of claim 1, wherein a temperature of the first press roller is greater than a temperature of the second press roller, and a temperature of the fourth press roller is greater than a temperature of the third press roller.

3. The battery pole piece forming apparatus of claim 1, wherein the first mounting assembly comprises two first mounting structures opposite to each other and two second mounting structures opposite to each other, the first press roller is mounted between the two first mounting structures, the second press roller is mounted between the two second mounting structures, the first driving mechanism comprises two first driving structures, and the two first driving structures are each configured to drive a respective one of the two first mounting structures to move towards or away from the second press roller.

4. The battery pole piece forming apparatus of claim 1, further comprising a second driving mechanism and a second mounting assembly, wherein the third press roller and the fourth press roller are mounted on the second mounting assembly, and the second driving mechanism is configured to drive the second mounting assembly to move towards or away from the second press roller.

5. The battery pole piece forming apparatus of claim 4, wherein the second mounting assembly comprises two support structures opposite to each other, two third mounting structures opposite to each other, and two fourth mounting structures opposite to each other; each of the two support structures is provided with one of the two third mounting structures and one of the two fourth mounting structures; one of the third press roller or the fourth press roller is mounted between the two third mounting structures; another of the third press roller or the fourth press roller is mounted between the two fourth mounting structures; among the two third mounting structures and the two fourth mounting structures, at least one of a third mounting structure or a fourth mounting structure is slidably disposed on a corresponding one of the two support structures; and the two support structures are connected to the second driving mechanism.

6. The battery pole piece forming apparatus of claim 5, further comprising a third driving mechanism, wherein the third driving mechanism is configured to drive at least one of the two fourth mounting structures or the two third mounting structures to make the third press roller and the fourth press roller move towards or away from each other.

7. The battery pole piece forming apparatus of claim 6, wherein the third driving mechanism comprises two third driving structures; and each third driving structure of the two third driving structures is configured to drive a corresponding one of the two fourth mounting structures to move towards or away from a corresponding one of the two third mounting structures.

8. The battery pole piece forming apparatus of claim 7, wherein the each third driving structure comprises a driving member, a pushing block, and a first elastic member; the driving member is configured to drive the pushing block to move along the vertical direction, the first elastic member of the each third driving structure is disposed between a corresponding one of the two third mounting structures and a corresponding one of the two fourth mounting structures; and the pushing block is configured to push a corresponding one of the two fourth mounting structures towards a corresponding one of the two third mounting structures when the driving member drives the pushing block to move downwards.

9. The battery pole piece forming apparatus of claim 8, wherein the each third driving structure further comprises a second elastic member disposed between the pushing block and a corresponding one of the two support structures.

10. The battery pole piece forming apparatus of claim 1, wherein the feeding mechanism comprises at least two hoppers; a feeding port of at least one of the at least two hoppers is located between and disposed above the first press roller and the second press roller; and a feeding port of at least another one of the at least two hoppers is located between and disposed above the third press roller and the fourth press roller.

11. The battery pole piece forming apparatus of claim 1, wherein the conveying mechanism comprises a first support member and a second support member; the first support member is configured to support a substrate web; and a winding roller is disposed on the second support member and configured to drive the substrate to vertically pass between the second press roller and the third press roller.

12. A battery pole piece forming method, the method being applied to a battery pole piece forming apparatus, wherein the apparatus comprises a conveying mechanism configured to convey a substrate; a feeding mechanism; and a press roller mechanism, wherein the press roller mechanism comprises a first press roller, a second press roller, a third press roller, and a fourth press roller arranged side by side in sequence; a spacing between the first press roller and the second press roller is the same as a spacing between the third press roller and the fourth press roller; the second press roller and the third press roller are configured to make the substrate pass between the second press roller and the third press roller along a vertical direction; the first press roller and the second press roller are configured to roll-press active substance particles conveyed by the feeding mechanism to form a first membrane; the third press roller and the fourth press roller are configured to roll-press active substance particles conveyed by the feeding mechanism to form a second membrane; and the second press roller and the third press roller are configured to roll-press the first membrane and the second membrane onto one side of the substrate and another side of the substrate respectively, wherein the apparatus further comprises a first driving mechanism and a first mounting assembly, the first press roller and the second press roller are mounted on the first mounting assembly, and the first driving mechanism is configured to drive at least one of the first press roller or the second press roller to make the first press roller and the second press roller move towards or away from each other; and the method comprises:

roll-pressing the active substance particles to form the first membrane and the second membrane that have a same thickness; and roll-pressing the first membrane and the second membrane onto the one side of the substrate and the another side of the substrate respectively.

13. The battery pole piece forming method of claim 12, wherein a temperature of the first press roller is greater than a temperature of the second press roller, and a temperature of the fourth press roller is greater than a temperature of the third press roller.

14. The battery pole piece forming method of claim 12, wherein the first mounting assembly comprises two first mounting structures opposite to each other and two second mounting structures opposite to each other, the first press roller is mounted between the two first mounting structures, the second press roller is mounted between the two second mounting structures, the first driving mechanism comprises two first driving structures, and the two first driving structures are each configured to drive a respective one of the two first mounting structures to move towards or away from the second press roller.

15. The battery pole piece forming method of claim 12, wherein the apparatus further comprises a second driving mechanism and a second mounting assembly, the third press roller and the fourth press roller are mounted on the second mounting assembly, and the second driving mechanism is configured to drive the second mounting assembly to move towards or away from the second press roller.

16. The battery pole piece forming method of claim 15, wherein the second mounting assembly comprises two support structures opposite to each other, two third mounting structures opposite to each other, and two fourth mounting structures opposite to each other; each of the two support structures is provided with one of the two third mounting structures and one of the two fourth mounting structures; one of the third press roller or the fourth press roller is mounted between the two third mounting structures; another of the third press roller or the fourth press roller is mounted between the two fourth mounting structures; among the two third mounting structures and the two fourth mounting structures, at least one of a third mounting structure or a fourth mounting structure is slidably disposed on a corresponding one of the two support structures; and the two support structures are connected to the second driving mechanism.

17. The battery pole piece forming method of claim 16, wherein the apparatus further comprises a third driving mechanism, the third driving mechanism is configured to drive at least one of the two fourth mounting structures or the two third mounting structures to make the third press roller and the fourth press roller move towards or away from each other.

18. The battery pole piece forming method of claim 17, wherein the third driving mechanism comprises two third driving structures; and each third driving structure of the two third driving structures is configured to drive a corresponding one of the two fourth mounting structures to move towards or away from a corresponding one of the two third mounting structures.

* * * * *